US012012044B2

United States Patent
Parab et al.

(10) Patent No.: US 12,012,044 B2
(45) Date of Patent: Jun. 18, 2024

(54) INDEXABLE VENT MOUNT

(71) Applicant: ANNEX PRODUCTS PTY. LTD., South Yarra (AU)

(72) Inventors: Nish Parab, South Yarra (AU); Christopher L. Peters, South Yarra (AU)

(73) Assignee: ANNEX PRODUCTS PTY LTD, South Yarra (AU)

( * ) Notice: Subject to any disclaimer, the term of this patent is extended or adjusted under 35 U.S.C. 154(b) by 0 days.

(21) Appl. No.: 17/853,041

(22) Filed: Jun. 29, 2022

(65) Prior Publication Data

US 2024/0001863 A1    Jan. 4, 2024

(51) Int. Cl.
| | |
|---|---|
| B60R 11/02 | (2006.01) |
| B60H 1/00 | (2006.01) |
| F16B 2/12 | (2006.01) |
| F16M 13/02 | (2006.01) |
| B60R 11/00 | (2006.01) |

(52) U.S. Cl.
CPC .......... B60R 11/02 (2013.01); B60H 1/00507 (2013.01); F16B 2/12 (2013.01); F16M 13/022 (2013.01); B60R 2011/0008 (2013.01); B60R 2011/0059 (2013.01); B60R 2011/0089 (2013.01); F16M 2200/024 (2013.01)

(58) Field of Classification Search
CPC .... B60R 11/02; B60R 2011/0008; F16B 2/12; F16M 13/022
USPC ................... 248/595, 222.51, 288.31, 288.51
See application file for complete search history.

(56) References Cited

U.S. PATENT DOCUMENTS

| | | | |
|---|---|---|---|
| 5,593,124 A | 1/1997 | Wang | |
| 5,931,440 A | 8/1999 | Miller | |
| 5,979,724 A | 11/1999 | Loewenthal, Jr. et al. | |
| 8,505,795 B2 | 8/2013 | Dunn | |
| 8,757,461 B2 | 6/2014 | Zanetti | |
| 9,004,331 B2 | 4/2015 | Fan | |
| 9,243,739 B2 | 1/2016 | Peters | |
| 9,445,512 B2 * | 9/2016 | Wang | F16M 13/022 |
| 9,701,256 B2 | 7/2017 | Haymond et al. | |
| 9,744,913 B2 | 8/2017 | Ormsbee et al. | |
| 9,821,722 B1 | 11/2017 | Jones | |
| 9,868,532 B2 | 1/2018 | Balmer | |
| 10,150,426 B2 | 12/2018 | Ormsbee et al. | |
| 10,308,191 B2 * | 6/2019 | Richter | B60R 11/02 |

(Continued)

FOREIGN PATENT DOCUMENTS

| | | |
|---|---|---|
| CN | 112565497 | 3/2021 |
| EP | 1096353 | 5/2001 |

(Continued)

OTHER PUBLICATIONS

Search Report & Written Opinion issued in PCT/IB2023/056695 (Aug. 14, 2023).

*Primary Examiner* — Todd M Epps
(74) *Attorney, Agent, or Firm* — Barnes & Thornburg LLP

(57) ABSTRACT

A vent mount including a base and a head coupled to the base. A retainer of the base is movable between an extended position for insertion into a vehicle air vent and a retracted position to capture a louver of the vehicle air vent to hold the vent mount on the vehicle air vent. The head is configured to engage with a case for positioning a handheld electronic device relative to the vehicle air vent.

18 Claims, 7 Drawing Sheets

(56) References Cited

U.S. PATENT DOCUMENTS

| | | | | |
|---|---|---|---|---|
| 11,364,855 | B2* | 6/2022 | Leimer | F16M 11/14 |
| 11,400,866 | B1* | 8/2022 | Xu | B60R 11/00 |
| 11,535,170 | B2* | 12/2022 | Fan | B60R 11/02 |
| 2008/0190978 | A1 | 8/2008 | Brassard | |
| 2009/0072106 | A1 | 3/2009 | Zheng | |
| 2021/0129767 | A1 | 5/2021 | Leimer | |
| 2021/0129768 | A1 | 5/2021 | Leimer | |
| 2021/0178862 | A1* | 6/2021 | Alves | B60R 11/02 |
| 2021/0249880 | A1 | 8/2021 | Taylor et al. | |

FOREIGN PATENT DOCUMENTS

| | | |
|---|---|---|
| JP | H08-276793 | 10/1996 |
| JP | 2001071828 | 3/2001 |
| KR | 20180040317 | 4/2018 |
| KR | 102004935 | 7/2019 |
| KR | 102004935 B1 * | 7/2019 |

* cited by examiner

A vent mount in accordance with the present disclosure
INDEXABLE VENT MOUNT

BACKGROUND

The present disclosure relates to a mount, and particularly to a mount for handheld electronic devices. More particularly, the present disclosure relates to a vent mount for handheld electronic devices.

SUMMARY

A vent mount in accordance with the present disclosure includes a base and a head coupled to the base. A retainer of the base is movable between an extended position for insertion into a vehicle air vent and a retracted position to capture a louver of the vehicle air vent to hold the vent mount on the vehicle air vent. The head is configured to engage with a case for positioning a handheld electronic device relative to the vehicle air vent.

In illustrative embodiments, the base includes a body, a back plate coupled to the body along an axis, and an indexable connector configured to selectively control rotation of the body relative to the back plate about the axis. The indexable connector is movable between a first configuration blocking rotation of the body relative to the back plate and a second configuration allowing rotation of the body relative to the back plate about the axis. The indexable connector is configured to hold the body in two or more index positions relative to the back plate at the selection of a user.

In illustrative embodiments, the indexable connector includes a first detent defined by the body and a second detent defined by the back plate. The second detent engages with the first detent in the first configuration of the indexable connector to block rotation of the body relative to the back plate about the axis. In the second configuration of the indexable connector, the back plate is extended away from the body to release a portion of the second detent from a portion of the first detent to allow rotation of the body relative to the back plate about the axis.

In illustrative embodiments, the first detent includes a stem extending from the body, at least two recesses formed into the stem, and at least two projections extending from the stem. The second detent includes a socket defined by the back plate and at least two lugs arranged in the socket and separated by at least two channels. In the first configuration of the indexable connector, the lugs of the second detent are received in the recesses of the first detent and the projections of the first detent are received in the channels of the second detent. The lugs engage with the projections to block rotation of the body relative to the back plate in the first configuration. In the second configuration of the indexable connector, the back plate is moved away from the body to remove the lugs from the recesses and the projections from the channels to release engagement of the lugs with the projections to allow rotation of the body relative to the back plate.

In illustrative embodiments, inner ribs are arranged in the recesses of the first detent and outer ribs are arranged on the projections. The inner and outer ribs extend away from the axis. Catches are arranged on the lugs of the second detent and extend toward the axis. A retention ring is arranged in the socket extending toward the axis and spaced apart from the lugs. The retention ring is arranged to engage with the outer ribs to resist removal of the back plate from the body. The catches are arranged to engage with the inner ribs to resist movement of the indexable connector from the first configuration to the second configuration.

In illustrative embodiments, the retainer of the base includes a driver, a clip, and a carriage arranged along the axis. The clip is coupled to the carriage for movement with the carriage along the axis relative to the body of the base. The driver is coupled to the body and engages with the carriage to drive movement of the carriage and attached clip with rotation of the driver about the axis relative to the body. The clip extends into a slot formed through the back plate to couple with the carriage. The slot is configured to receive the clip and to engage with the clip to block relative rotation between the clip and the back plate.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures, and like reference characters designate the same or similar parts throughout the figures, of which.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

Figure 1:
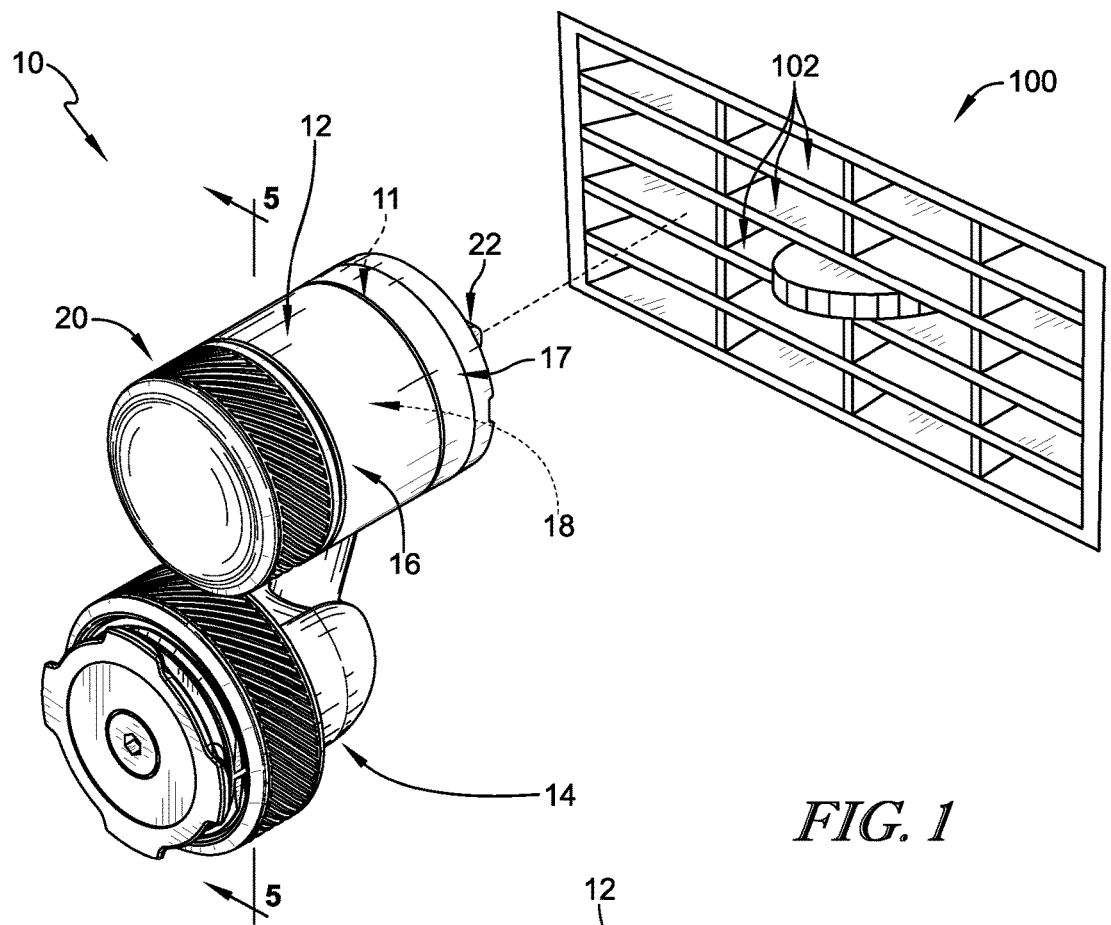
FIG. 1 is a front perspective view of a vent mount in accordance with the present disclosure showing that the vent mount includes a base and a head coupled to the base and suggesting that a retainer of the base is arranged to hold the vent mount on a louver of a vehicle air vent.
Figure 2:
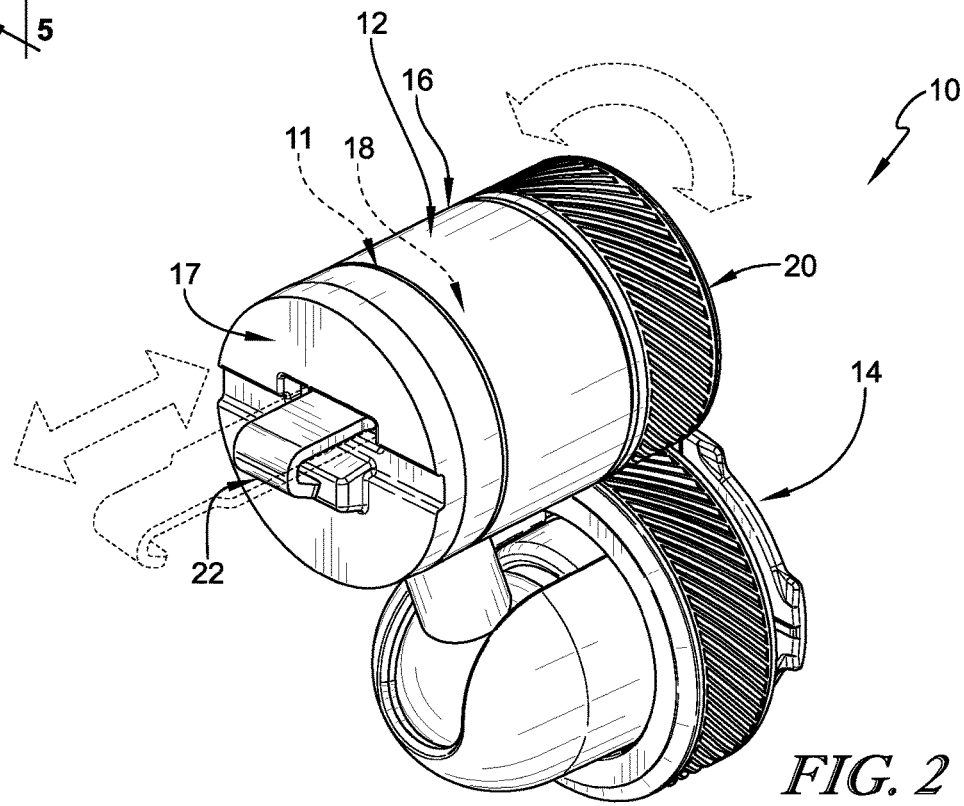
FIG. 2 is a rear perspective view of the vent mount of FIG. 1 showing that a clip of the retainer is movable between an extended position and a retracted position with rotation of a driver of the retainer for attachment of the vent mount to the louver of the vehicle air vent as suggested in FIG. 6.
Figure 3:
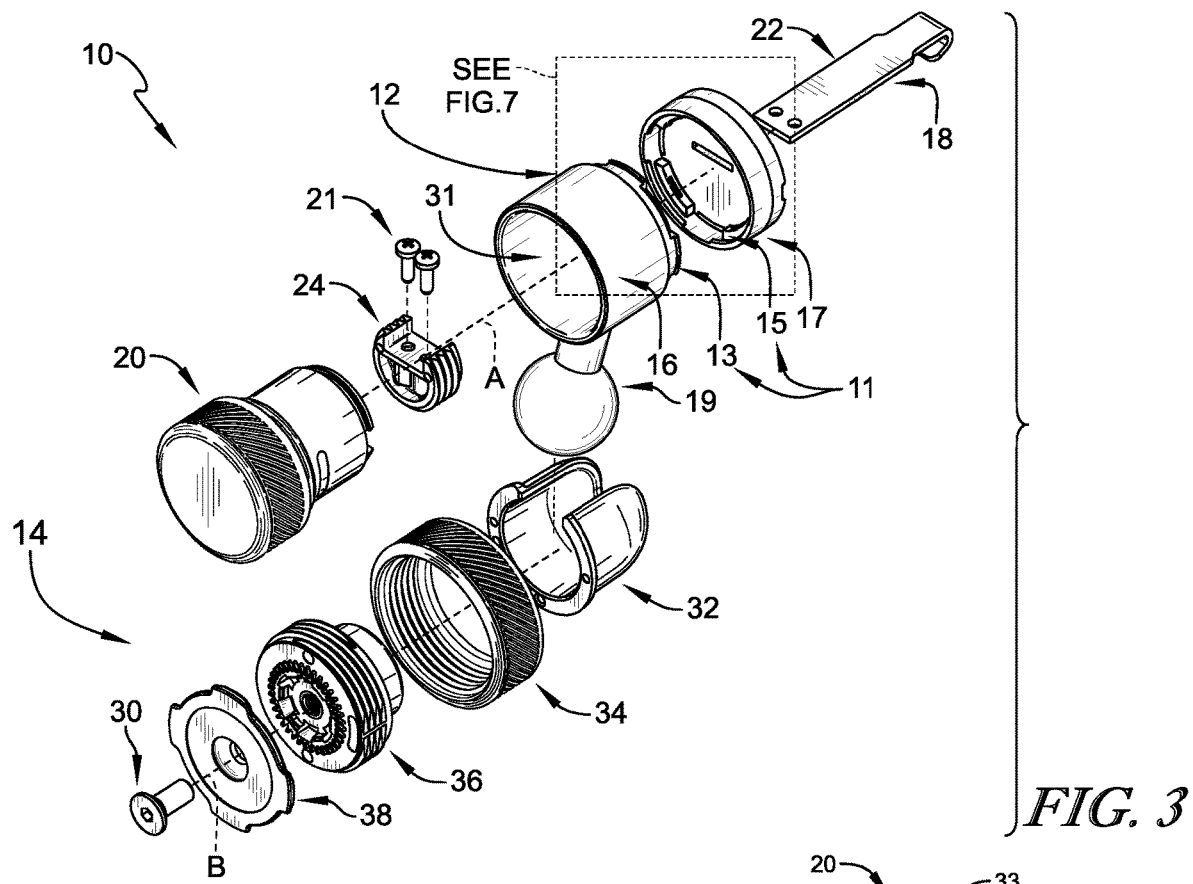
FIG. 3 is a front perspective exploded assembly view of the vent mount of FIG. 1.
Figure 4:
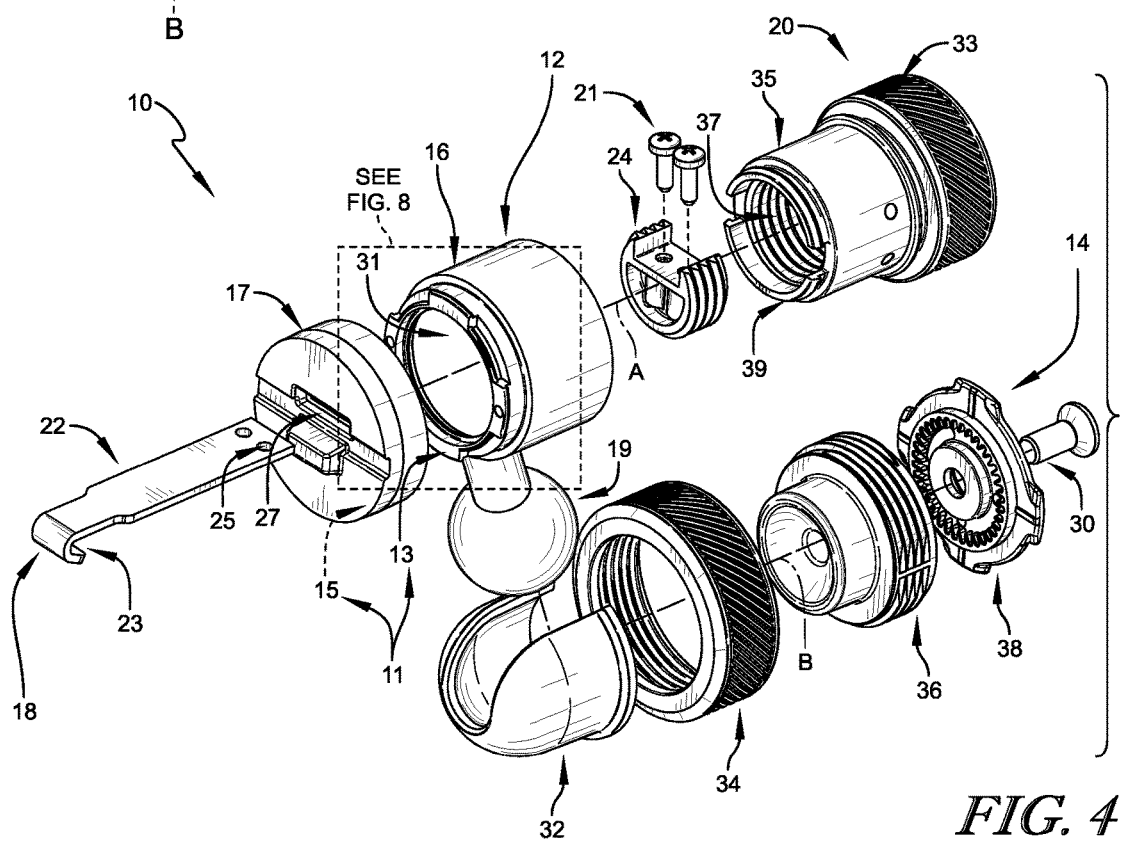
FIG. 4 is a rear perspective exploded assembly view of the vent mount of FIG. 2.

A vent mount 10 in accordance with the present disclosure is shown in FIGS. 1 and 2. The mount 10 is configured for attachment with a vehicle air vent 100 and to engage with an illustrative case 110 (FIG. 13) for positioning a handheld electronic device, such as a smartphone, tablet, GPS unit, or monitor, relative to the vehicle air vent 100. Another exemplary case and arrangement for connection with a mount is disclosed in U.S. Pat. No. 9,243,739. The mount 10 includes a base 12 and a head 14 coupled to the base for positioning the case 110 and attached handheld electronic device relative to the base 12. The base 12 includes a body 16, a back plate 17 coupled to the body 16 by an indexable connector 11, and a retainer 18 coupled to the body 16 and arranged for movement relative to the body 16 for securing the mount 10 to the vehicle air vent 100. An arm 19 extends from the body 16 for connection of the head 14 to the base 12 as shown in FIGS. 3 and 4. A driver 20 of the retainer 18 is configured to extend and retract a clip 22 with rotation of the driver 20 for gripping a louver 102 of the vehicle air vent 100 as shown in FIGS. 1, 2, 5, and 6. The indexable connector 11 is configured to retain the back plate 17 on the body 16 and allow selective rotation of the body 16 and attached head 14 relative to the back plate 17 as shown in FIGS. 7-12.

In the illustrative embodiment, the indexable connector 11 includes a first detent 13 defined by the body 16 and a second detent 15 defined by the back plate 17 as shown in FIGS. 3 and 4. The second detent 15 engages with the first detent 13 in a first configuration of the indexable connector 11 to block rotation of the body 16 relative to the back plate 17. In a second configuration of the indexable connector 11, the back plate 17 is extended away from the body 16 to release a portion of the second detent 15 from a portion of the first detent 13 to allow rotation of the body 16 relative to the back plate 17 about an axis A as shown in FIGS. 9-12.

As shown in FIGS. 3 and 4, the retainer 18 includes the driver 20, the clip 22, and a carriage 24 arranged along an axis A in an exemplary embodiment. The clip 22 is coupled to the carriage 24 for movement with the carriage 24 along axis A relative to the body 16 of the base 12. The driver 20 is coupled to the body 16 and engages with the carriage 24 to drive movement of the carriage 24 and attached clip 22 with rotation of the driver 20 about axis A relative to the body 16. In some embodiments, the clip 22 includes a hook 23 arranged at one end of the clip 22 and one or more apertures 25 extending through the clip 22 at an opposite end of the clip 22 from the hook 23 as shown in FIG. 4. The clip 22 extends into a slot 27 formed through the back plate 17 to couple with the carriage 24. One or more fasteners 21, such as screws or bolts, extend through the apertures 25 and into the carriage 24 to secure the clip 22 to the carriage 24. Alternative arrangements for attaching the clip 22 to the carriage 24 are also contemplated by the present disclosure, such as adhesives and snap fittings, among others. In the illustrative arrangement, the slot 27 is configured to receive the clip 22 and to engage with the clip 22 to block relative rotation between the clip 22 and the back plate 17.

Figure 5:
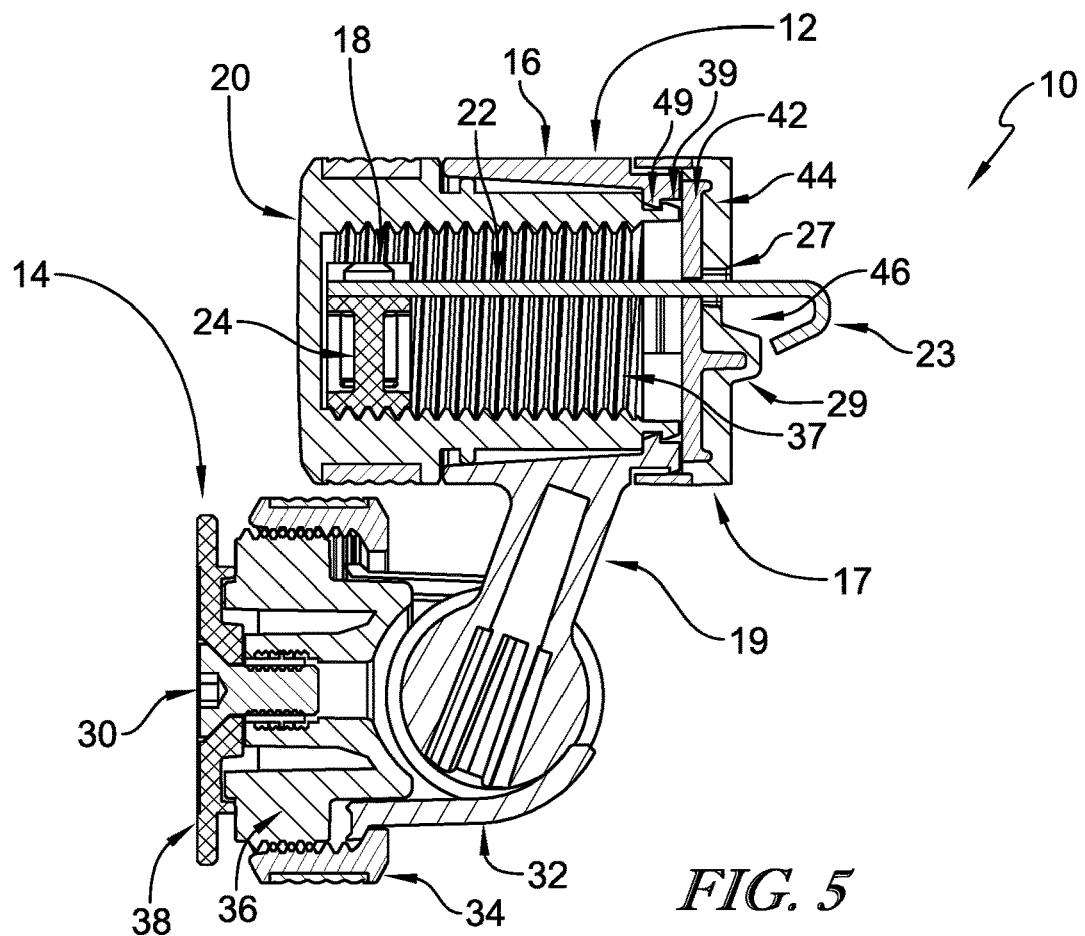
FIG. 5 is a sectional view taken along line 5-5 in FIG. 1 showing that the clip is coupled to a carriage of the retainer and suggesting that the driver is configured to engage with the carriage to drive movement of the clip with rotation of the driver.

The exemplary driver 20 includes a knob 33 and a barrel 35 extending from the knob 33 and defining an inner cavity 37 as shown in FIGS. 4 and 5. The barrel 35 extends into a bore 31 of the body 16, and a flange 39 arranged at a distal end of the barrel 35 engages with a flange 49 (FIGS. 5 and 8) defined by the body 16 to hold the driver 20 on the body 16 and allow rotation of the driver 20 relative to the body 16 about axis A. In the illustrative embodiment, threads are formed in the cavity 37 of the driver 20 and mating threads are formed on the carriage 24 to drive relative movement of the carriage 24 along the cavity 37 with rotation of the driver 20. Alternative arrangements for moving the carriage 24 relative to the driver 20 are also contemplated by the present disclosure, such as a tab on the carriage 24 positioned in a helical slot on the inner cavity 37 of the driver 20, among others.

Figure 6:
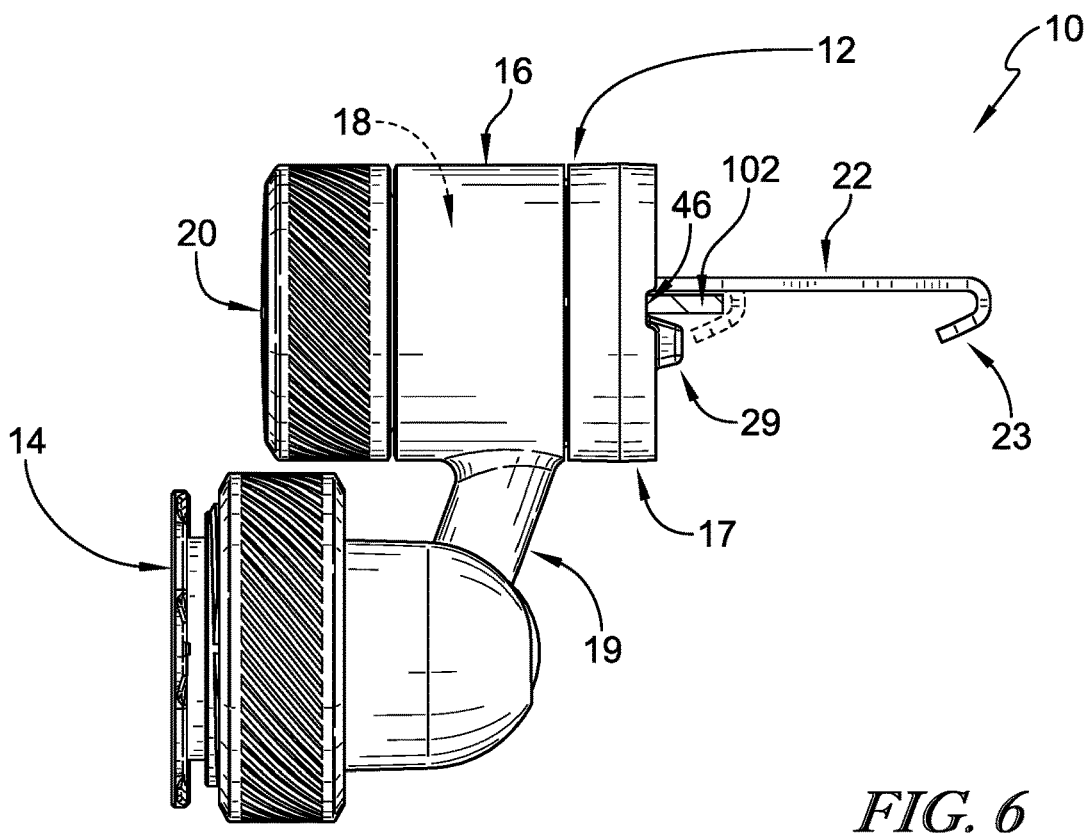
FIG. 6 is a side elevation view of the vent mount of FIG. 2 showing that a hook of the clip is configured to trap a louver of the vehicle air vent between the hook and a back plate of the base to hold the vent mount on the vehicle air vent.

The clip 22 coupled to the carriage 24 is movable along axis A between an extended position and a retracted position as shown in FIG. 6. In the extended position, the hook 23 is spaced apart from the back plate to allow the hook 23 to pass between the louvers 102 of the vehicle air vent 100 and arrange the hook 23 on an opposite side of one of the louvers 102 from the back plate 17. Rotation of the driver 20, such as by a user gripping and rotating the knob 33, engages the threads of the driver 20 with the threads of the carriage 24 to move the carriage 24 and attached clip 22 relative to the body 16 from the extended position to the retracted position to trap one of the louvers 102 between the hook 23 and the back plate 17 and hold the mount 10 on the vehicle air vent 100. In some embodiments, a groove 46 (FIGS. 4-6) is defined by the back plate 17 and aligned with the hook 23 of the clip 22 to receive the louver 102. In some embodiments, a ramp 29 is defined on the back plate 17 to assist in aligning the louver 102 relative to the back plate 17. In some embodiments, the back plate 17 is formed by a substantially rigid lid 42 and an elastic pad 44 coupled to the lid 42 in order to dampen vibrations, for example. In other embodiments, the back plate 17 is formed as a unitary and integral part.

The exemplary head 14 illustratively includes a cover 32, a sleeve 34, a clamp 36 and a cap 38 arranged along an axis B as shown in FIGS. 3-5. The cover 32 extends around the arm 19 of the body 16 and the sleeve 34 engages with the cover 32 and the clamp 36 to hold the head 14 on the base 12. The sleeve 34 includes internal threads and the clamp 36 has mating external threads for movement of the clamp 36 toward and away from the arm 19 along axis B with rotation of the sleeve 34. The clamp 36 selectively engages with the arm 19 to force the arm 19 against the cover 32 to maintain a position of the head 14 relative to the body 16. Rotation of the sleeve 34 to move the clamp 36 away from the arm 19 allows movement of the head 14 relative to the body 16. A fastener 30, such as a screw or bolt, extends through the cap 38 and engages with the clamp 36 to hold the cap 38 on the clamp 36. The cap 38 is part of a mounting arrangement for attachment of a case 110 (FIG. 13) on a handheld electronic device to the vent mount 10. Other mounting arrangements are also contemplated, such as a magnetic attachment disclosed in, for example, co-pending U.S. Prov. Pat. App. No. 63/290,799. In some embodiments, the head 14 can also include other features, such as wireless charging capability as disclosed in, for example, U.S. Pat. No. 11,303,143. Other arrangements for allowing selective movement of the head relative to the arm 19 are also contemplated, such as disclosed in co-pending U.S. patent application Ser. No. 17/404,391.

Figure 7:
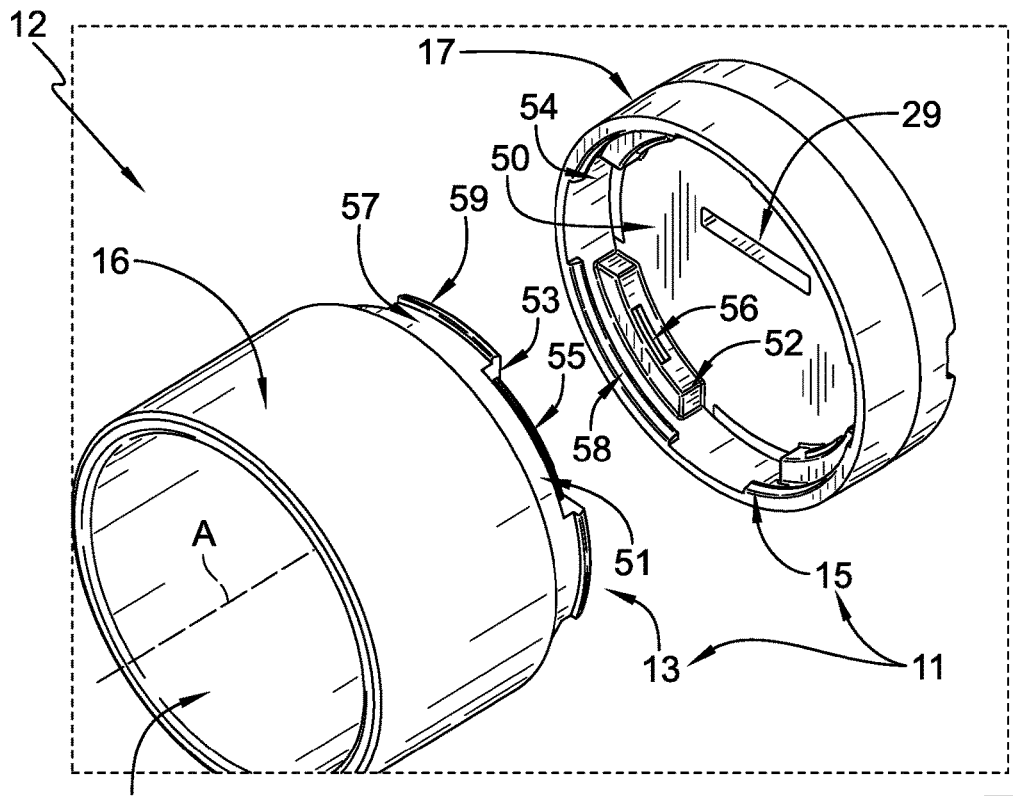
FIG. 7 is an enlarged view of the vent mount of FIG. 3 showing that an indexable connector includes first and second detents which, in a first configuration, block rotation of a body of the base relative to the back plate of the base and, in a second configuration, allow rotation of the body relative to the back plate as suggested in FIGS. 9-12.
Figure 8:
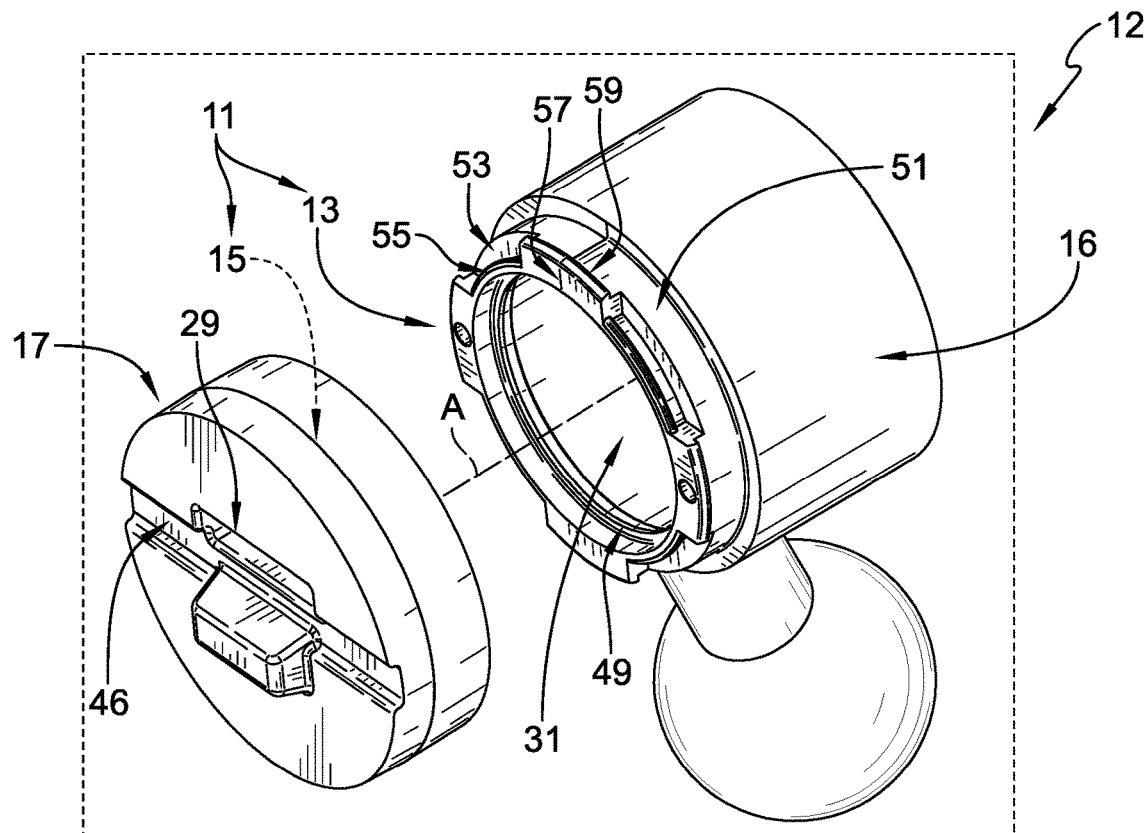
FIG. 8 is an enlarged view of the indexable connector of FIG. 4.
Figure 9:
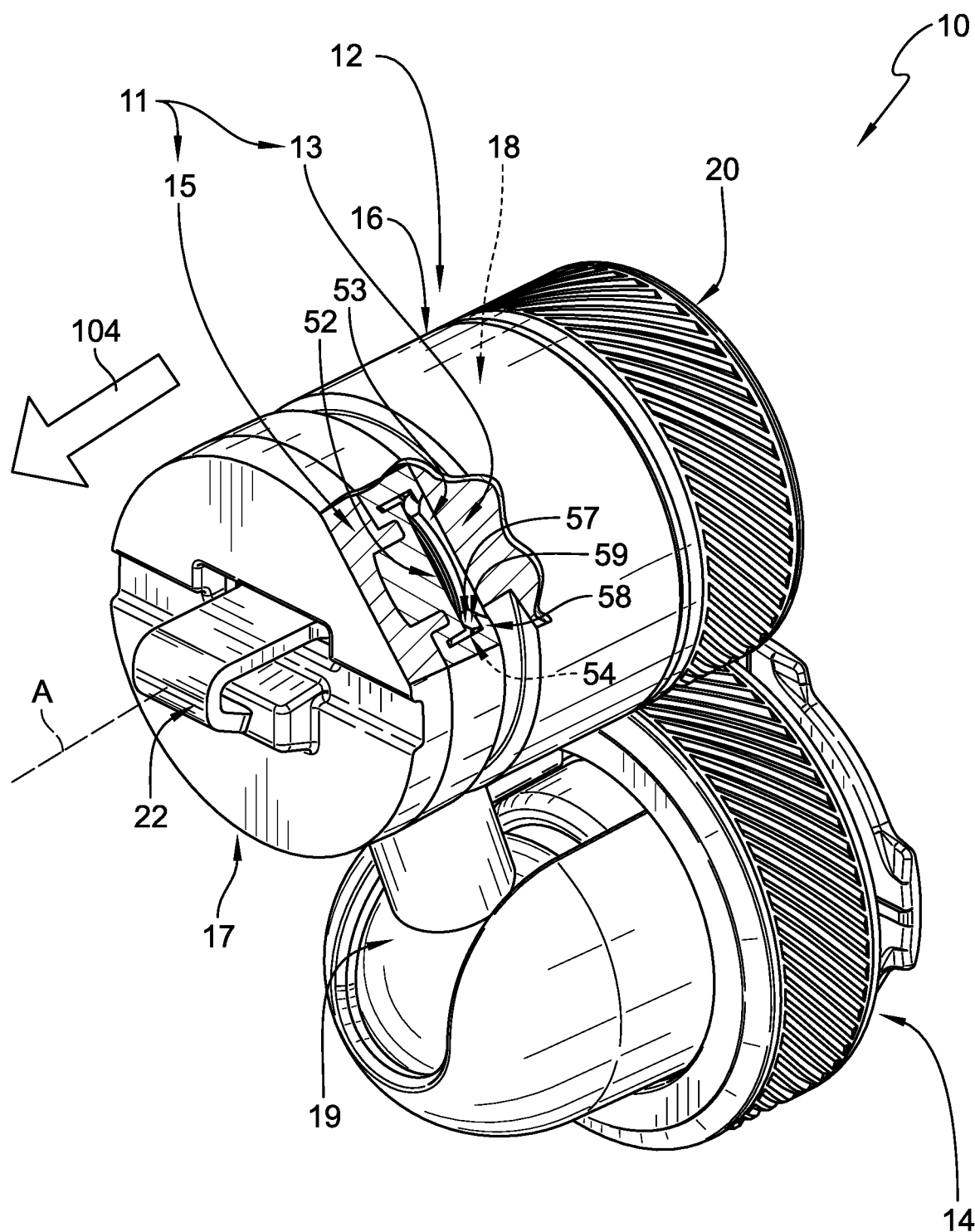
FIG. 9 is a rear perspective view of the vent mount of FIG. 2 with portions broken away to show the indexable connector in the second configuration.
Figure 10:
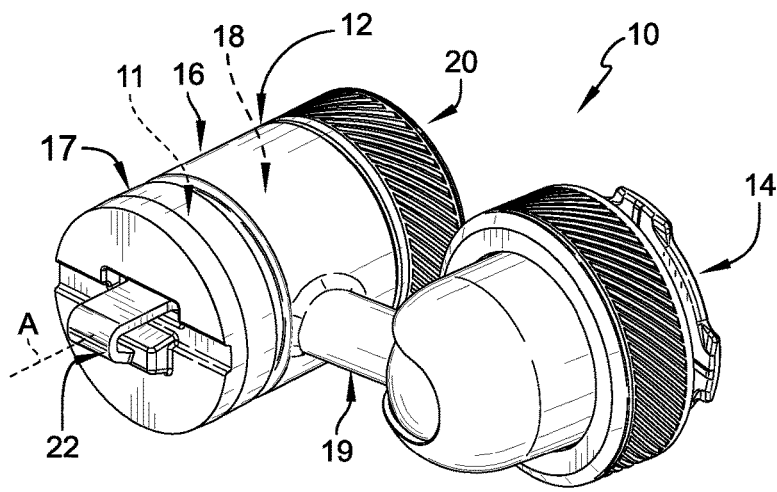
FIGS. 10-12 are a series of views illustrating various index positions of the body relative to the back plate.
Figure 11:
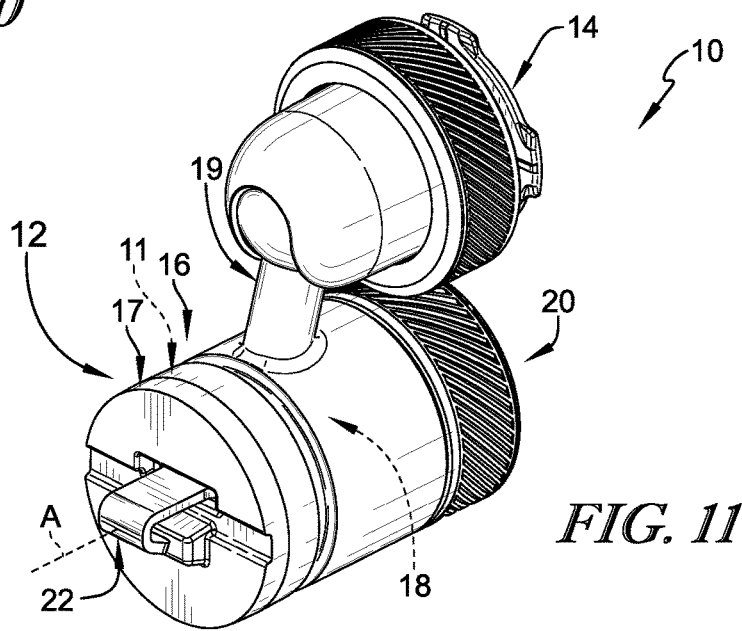
Figure 12:
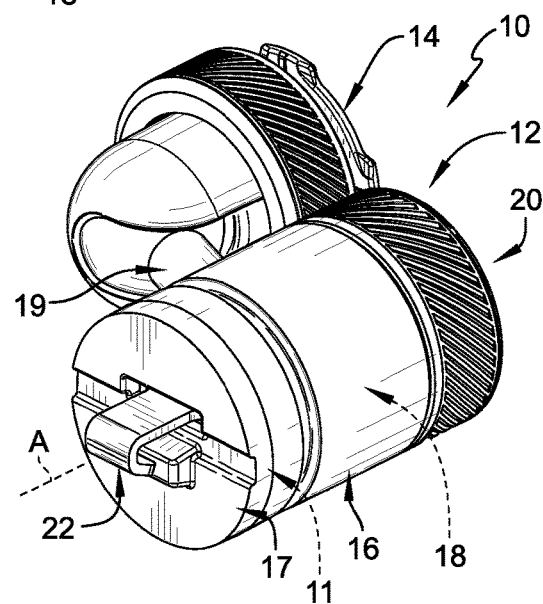

In the illustrative embodiment, the first detent 13 includes a stem 51 extending from the body 16, recesses 53 formed into the stem 51, and projections 57 extending from the stem 51 as shown in FIGS. 7 and 8. Inner ribs 55 are arranged in the recesses 53 and outer ribs 59 are arranged on the projections 57. The ribs 55, 59 extend away from axis A. The second detent 15 includes a socket 50 defined by the back plate 17 and lugs 52 arranged in the socket 50 and separated by channels 54. Catches 56 are arranged on the lugs 52 and extend toward axis A. A retention ring 58 is arranged in the socket 50 extending toward axis A and spaced apart from the lugs 52.

As mentioned above, the indexable connector 11 is movable between a first configuration and a second configuration. In the first configuration, the lugs 52 of the second detent 15 are received in the recesses 53 of the first detent 13 and the projections 57 of the first detent 13 are received in the channels 54 of the second detent 15. The lugs 52 engage with the projections 57 to block rotation of the body 16 relative to the back plate 17 in the first configuration. In the second configuration of the indexable connector 11, the back plate 17 is moved away from the body 16 (as indicated by arrow 104 in FIG. 9) to remove the lugs 52 from the recesses 53 and the projections 57 from the channels 54 to release engagement of the lugs 52 with the projections 57 to allow rotation of the body 16 relative to the back plate 17 (and clip 22). The retention ring 58 is arranged to engage with the outer ribs 59 to resist removal of the back plate 17 from the body 16. In the illustrative embodiment, the retention ring 58 is segmented, and gaps between the segments are shorter than lengths of the outer ribs 59. In some embodiments, the retention ring 58 is continuous around the socket 50. The catches 56 are arranged to engage with the inner ribs 55 to resist movement of the indexable connector 11 from the first configuration to the second configuration.

The indexable connector 11 as shown in FIGS. 7 and 8 provides for indexing of the body 16 relative to the back plate 17 at approximately 90 degree intervals (positions) about axis A as illustrated in FIGS. 9-12. While four lugs 52 and four projections 57 are shown (with a corresponding number of recesses 53 and channels 54), more or less may be used in accordance with the present disclosure. For example, in some embodiments, six lugs 52 and six projections 57 can be used to provide indexing of the body 16 relative to the back plate 17 at approximately 60 degree intervals about axis A. In other embodiments, eight lugs 52 and eight projections 57 can be used to provide indexing of the body 16 relative to the back plate 17 at approximately 45 degree intervals about axis A. In other embodiments, two lugs 52 and two projections 57 can be used to provide indexing of the body 16 relative to the back plate 17 at approximately 180 degree intervals about axis A. It should also be understood that various combinations in the number of lugs 52 and projections 57 can be used. For example, in some embodiments, the first detent 13 can include two projections 57 while the second detent 15 includes four lugs 52 to provide indexing of the body 16 relative to the back plate 17 at approximately 90 degree intervals about axis A. In other embodiments, the first detent 13 can include eight projections 57 while the second detent 15 includes two lugs 52 to provide indexing of the body 16 relative to the back plate 17 at approximately 45 degree intervals about axis A. In other embodiments, the first detent 13 can include one projection 57 while the second detent 15 includes two lugs 52 to provide indexing of the body 16 relative to the back plate 17 at approximately 180 degree intervals about axis A. In other embodiments, the first detent 13 can include four projections 57 while the second detent 15 includes one lug 52 to provide indexing of the body 16 relative to the back plate 17 at approximately 90 degree intervals about axis A. These combinations are merely exemplary, and it should be understood that at least one projection 57 or lug 52 in combination with at least two of the opposite projections 57 or lugs 52 on the detents 13, 15 can provide indexing of the body 16 with respect to the back plate 17 in accordance with the present disclosure.

Various other modifications can be made without departing from the present disclosure. For example, while the body 16 and back plate 17 are shown as circular, other geometric and non-geometric shapes are also contemplated by the present disclosure. In some embodiments, the body 16 and back plate 17 can be partially or entirely square. The detents 13, 15 of the indexable connector 11 can similarly be other geometric and non-geometric shapes. For example, in some embodiments, the detents 13, 15 can be partially or entirely square with the corners of the squares providing the engaging surfaces of the detents 13, 15 to allow the body 16 to index relative to the back plate 17 at approximately 45 degree intervals about axis A. In other embodiments, the structures of the first and second detents 13, 15 can be reversed and operate in accordance with the present disclosure. For example, the second detent 15 could include the stem 51, recess(es) 53, projection(s) 57, and rib(s) 55, 59 and the first detent 13 could include the socket 50, lug(s) 52, channel(s) 54, catch(es) 56, and retention ring 58. In other embodiments, the first detent 13 or the second detent 15 includes a stem 51, at least one projection 57 extending from the stem 51 and at least one recess 53 formed into the stem 51, while the other of the first detent 13 or the second detent 15 includes a socket 51 and at least one lug 52 arranged in the socket 51 and separated by at least one channel 54, and there are more projections 57 and recesses 53 than lugs 52 and channels 54 or more lugs 52 and channels 54 than projections 57 and recesses 53.

Figure 13:
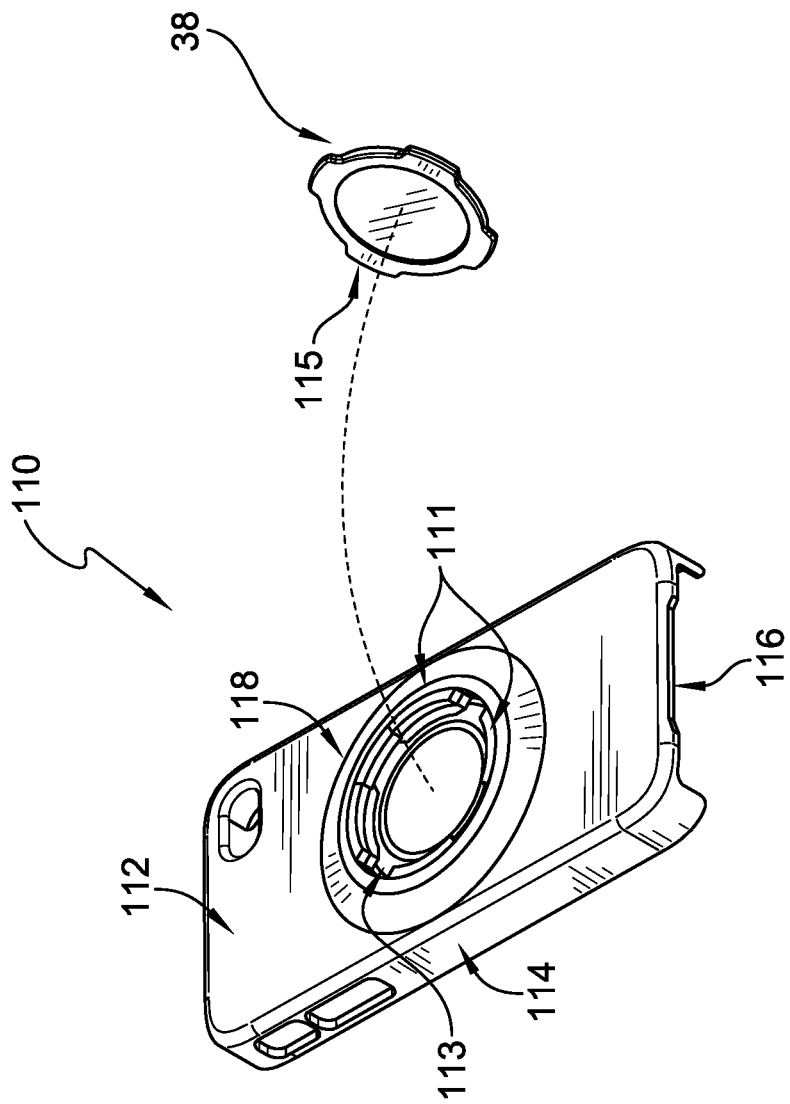
FIG. 13 is a perspective assembly view of a case configured for attachment to the head of the mount.

The exemplary case 110 includes a rear wall 112 and a perimeter wall 114 defining an interior space 116 for attachment with a handheld electronic device, such as a smartphone, tablet, GPS unit, or monitor for example, as shown in FIG. 13. A receiver 118 is formed in rear wall 112 and includes a series of case tabs 111 separated by the gaps 113. A series of mount tabs 115 extend outward from the cap 38 for engagement with the case tabs 111 to attach the case 110 (including the handheld electronic device stored therein) with the head 14 of the mount 10. The mount tabs 115 pass through the gaps 113, and the case 110 is rotated relative to the cap 38 of the head 14 to engage the mount tabs 115 with the case tabs 111. The case 110 may be constructed in any other suitable manner and may engage the head 14 in any other suitable manner in accordance with other embodiments of the present disclosure.

The mount 10 can be formed from substantially rigid materials, such as metal or plastic. Elastic materials, such as synthetic rubber, can be used to provide compliance to the mount 10 and/or provide additional frictional engagement, such as on the knob 33 of the driver 20, the sleeve 34 of the head 14, the distal end of the arm 19, and the back plate 17.

In illustrative embodiments, a vent mount in accordance with the present disclosure includes a base and a head coupled to the base. A retainer of the base is movable between an extended position for insertion into a vehicle air vent and a retracted position to capture a louver of the vehicle air vent to hold the vent mount on the vehicle air vent. The head is configured to engage with a case for positioning a handheld electronic device relative to the vehicle air vent.

In illustrative embodiments, the base includes a body, a back plate coupled to the body along an axis, and an indexable connector configured to selectively control rotation of the body relative to the back plate about the axis. The indexable connector is movable between a first configuration blocking rotation of the body relative to the back plate and a second configuration allowing rotation of the body relative to the back plate about the axis. The indexable connector is configured to hold the body in two or more index positions relative to the back plate at the selection of a user.

In illustrative embodiments, the indexable connector includes a first detent defined by the body and a second detent defined by the back plate. The second detent engages with the first detent in the first configuration of the indexable connector to block rotation of the body relative to the back plate about the axis. In the second configuration of the indexable connector, the back plate is extended away from the body to release a portion of the second detent from a portion of the first detent to allow rotation of the body relative to the back plate about the axis.

In illustrative embodiments, the first detent includes a stem extending from the body, at least two recesses formed into the stem, and at least two projections extending from the stem. The second detent includes a socket defined by the back plate and at least two lugs arranged in the socket and separated by at least two channels. In the first configuration of the indexable connector, the lugs of the second detent are received in the recesses of the first detent and the projections of the first detent are received in the channels of the second detent. The lugs engage with the projections to block rotation of the body relative to the back plate in the first configuration. In the second configuration of the indexable connector, the back plate is moved away from the body to remove the lugs from the recesses and the projections from the channels to release engagement of the lugs with the projections to allow rotation of the body relative to the back plate.

In illustrative embodiments, inner ribs are arranged in the recesses of the first detent and outer ribs are arranged on the projections. The inner and outer ribs extend away from the axis. Catches are arranged on the lugs of the second detent and extend toward the axis. A retention ring is arranged in the socket extending toward the axis and spaced apart from the lugs. The retention ring is arranged to engage with the outer ribs to resist removal of the back plate from the body. The catches are arranged to engage with the inner ribs to resist movement of the indexable connector from the first configuration to the second configuration.

In illustrative embodiments, the retainer of the base includes a driver, a clip, and a carriage arranged along the axis. The clip is coupled to the carriage for movement with the carriage along the axis relative to the body of the base. The driver is coupled to the body and engages with the carriage to drive movement of the carriage and attached clip with rotation of the driver about the axis relative to the body. The clip extends into a slot formed through the back plate to couple with the carriage. The slot is configured to receive the clip and to engage with the clip to block relative rotation between the clip and the back plate.

The following numbered clauses include embodiments that are contemplated and non-limiting:

Clause 1: A vent mount comprising: a base including: a body; a back plate coupled to the body along an axis; an indexable connector configured to selectively control rotation of the body relative to the back plate about the axis; a retainer coupled to the body and movable along the axis between an extended position for insertion into a vehicle air vent and a retracted position to capture a louver of the vehicle air vent between the retainer and the back plate to hold the vent mount on the vehicle air vent; and a head coupled to the base, wherein the indexable connector is movable between a first configuration blocking rotation of the body relative to the back plate and a second configuration allowing rotation of the body relative to the back plate about the axis, and the indexable connector is configured to hold the body in two or more index positions relative to the back plate at the selection of a user.

Clause 2: The vent mount of clause 1, wherein the indexable connector includes a first detent defined by the body and a second detent defined by the back plate, wherein the second detent engages with the first detent in the first configuration of the indexable connector to block rotation of the body relative to the back plate about the axis, and wherein the back plate is extended away from the body to release a portion of the second detent from a portion of the first detent in the second configuration of the indexable connector to allow rotation of the body relative to the back plate about the axis.

Clause 3: The vent mount of clause 1 or 2, wherein the first detent includes a stem extending from the body, at least two recesses formed into the stem, and at least two projections extending from the stem, wherein the second detent includes a socket defined by the back plate and at least two lugs arranged in the socket and separated by at least two channels, wherein, in the first configuration of the indexable connector, the lugs of the second detent are received in the recesses of the first detent and the projections of the first detent are received in the channels of the second detent and the lugs engage with the projections to block rotation of the body relative to the back plate about the axis, and wherein, in the second configuration of the indexable connector, the back plate is moved away from the body to remove the lugs from the recesses and the projections from the channels to release engagement of the lugs with the projections to allow rotation of the body relative to the back plate about the axis.

Clause 4: The vent mount of any preceding clause, further comprising inner ribs arranged in the recesses of the first detent and catches arranged on the lugs of the second detent, wherein the catches are configured to engage with the inner ribs to resist movement of the indexable connector from the first configuration to the second configuration.

Clause 5: The vent mount of any preceding clause, wherein the inner ribs extend away from the axis, and wherein the catches extend toward the axis.

Clause 6: The vent mount of any preceding clause, further comprising outer ribs arranged on the projections of the first detent and a retention ring arranged in the socket of the second detent and spaced apart from the lugs, wherein the retention ring is configured to engage with the outer ribs to resist removal of the back plate from the body.

Clause 7: The vent mount of any preceding clause, wherein the outer ribs extend away from the axis, and wherein the retention ring extends toward the axis.

Clause 8: The vent mount of any preceding clause, wherein the retainer of the base includes a driver, a clip, and a carriage arranged along the axis, wherein the clip is coupled to the carriage for movement with the carriage along the axis relative to the body of the base, and wherein the driver is coupled to the body and engages with the carriage to drive movement of the carriage and attached clip with rotation of the driver about the axis relative to the body.

Clause 9: The vent mount of any preceding clause, wherein the clip extends into a slot formed through the back plate to couple with the carriage, and wherein the slot is configured to receive the clip and to engage with the clip to block relative rotation between the clip and the back plate.

Clause 10: A vent mount comprising: a base including: a body; a back plate coupled to the body along an axis; an indexable connector configured to selectively control rotation of the body relative to the back plate about the axis; a retainer coupled to the body and movable along the axis between an extended position for insertion into a vehicle air vent and a retracted position to capture a louver of the vehicle air vent between the retainer and the back plate to hold the vent mount on the vehicle air vent; and a head coupled to the base, the head configured to engage with a case for positioning a handheld electronic device relative to the vehicle air vent, wherein the indexable connector is movable between a first configuration blocking rotation of the body relative to the back plate and a second configuration allowing rotation of the body relative to the back plate about the axis, and the indexable connector is configured to hold the body in two or more index positions relative to the back plate at the selection of a user.

Clause 11: The vent mount of clause 10, wherein the indexable connector includes a first detent defined by the body and a second detent defined by the back plate, wherein the second detent engages with the first detent in the first configuration of the indexable connector to block rotation of the body relative to the back plate about the axis, and wherein the back plate is extended away from the body to release a portion of the second detent from a portion of the first detent in the second configuration of the indexable connector to allow rotation of the body relative to the back plate about the axis.

Clause 12: The vent mount of clause 10 or 11, wherein the first detent includes a stem extending from the body, at least two recesses formed into the stem, and at least two projections extending from the stem, wherein the second detent includes a socket defined by the back plate and at least two lugs arranged in the socket and separated by at least two channels, wherein, in the first configuration of the indexable connector, the lugs of the second detent are received in the recesses of the first detent and the projections of the first detent are received in the channels of the second detent and the lugs engage with the projections to block rotation of the body relative to the back plate about the axis, and wherein, in the second configuration of the indexable connector, the back plate is moved away from the body to remove the lugs from the recesses and the projections from the channels to release engagement of the lugs with the projections to allow rotation of the body relative to the back plate about the axis.

Clause 13: The vent mount of any of clauses 10-12, further comprising inner ribs arranged in the recesses of the first detent and catches arranged on the lugs of the second detent, wherein the catches are configured to engage with the inner ribs to resist movement of the indexable connector from the first configuration to the second configuration.

Clause 14: The vent mount of any of clauses 10-13, wherein the inner ribs extend away from the axis, and wherein the catches extend toward the axis.

Clause 15: The vent mount of any of clauses 10-13, further comprising outer ribs arranged on the projections of the first detent and a retention ring arranged in the socket of the second detent and spaced apart from the lugs, wherein the retention ring is configured to engage with the outer ribs to resist removal of the back plate from the body.

Clause 16: The vent mount of any of clauses 10-15, wherein the outer ribs extend away from the axis, and wherein the retention ring extends toward the axis.

Clause 17: The vent mount of any of clauses 10-16, wherein the retainer of the base includes a driver, a clip, and a carriage arranged along the axis, wherein the clip is coupled to the carriage for movement with the carriage along the axis relative to the body of the base, and wherein the driver is coupled to the body and engages with the carriage to drive movement of the carriage and attached clip with rotation of the driver about the axis relative to the body.

Clause 18: The vent mount of clause any of clauses 10-17, wherein the clip extends into a slot formed through the back plate to couple with the carriage, and wherein the slot is configured to receive the clip and to engage with the clip to block relative rotation between the clip and the back plate.

Clause 19: A vent mount comprising: a base including: a body; a back plate coupled to the body along an axis; an indexable connector configured to selectively control rotation of the body relative to the back plate about the axis; a retainer coupled to the body and movable along the axis between an extended position for insertion into a vehicle air vent and a retracted position to capture a louver of the vehicle air vent between the retainer and the back plate to hold the vent mount on the vehicle air vent; and a head coupled to the base, the head configured to engage with a case for positioning a handheld electronic device relative to the vehicle air vent, wherein the indexable connector includes a first detent defined by the body and a second detent defined by the back plate, the first detent includes a stem extending from the body, at least two recesses formed into the stem, and at least two projections extending from the stem, the second detent includes a socket defined by the back plate and at least two lugs arranged in the socket and separated by at least two channels, the lugs of the second detent are received in the recesses of the first detent and the projections of the first detent are received in the channels of the second detent in a first configuration of the indexable connector and the lugs engage with the projections to block rotation of the body relative to the back plate about the axis, the back plate is moved away from the body to remove the lugs from the recesses and the projections from the channels to release engagement of the lugs with the projections in a second configuration of the indexable connector to allow rotation of the body relative to the back plate about the axis, and the indexable connector is configured to hold the body in two or more index positions relative to the back plate at the selection of a user.

Clause 20: The vent mount of clause 19, wherein the retainer of the base includes a driver, a clip, and a carriage arranged along the axis, wherein the clip is coupled to the carriage for movement with the carriage along the axis relative to the body of the base, wherein the driver is coupled to the body and engages with the carriage to drive movement of the carriage and attached clip with rotation of the driver about the axis relative to the body, wherein the clip extends into a slot formed through the back plate to couple with the carriage, wherein the slot is configured to receive the clip and to engage with the clip to block relative rotation between the clip and the back plate, wherein the indexable connector is configured to block rotation of the body relative to the clip about the axis in the first configuration, and wherein the indexable connector is configured to allow rotation of the body relative to the clip about the axis in the second configuration.

Clause 21: The vent mount of any preceding clause, wherein the first detent or the second detent includes a stem, at least one projection extending from the stem and at least one recess formed into the stem, and wherein the other of the first detent or the second detent includes a socket and at least one lug arranged in the socket and separated by at least one channel, and wherein there are more projections and recesses than lugs and channels or more lugs and channels than projections and recesses.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

What is claimed is:

1. A vent mount comprising:
   a base including:
      a body;
      a back plate coupled to the body along an axis;
      an indexable connector configured to selectively control rotation of the body relative to the back plate about the axis;
      a retainer coupled to the body and movable along the axis between an extended position for insertion into a vehicle air vent and a retracted position to capture a louver of the vehicle air vent between the retainer and the back plate to hold the vent mount on the vehicle air vent; and
   a head coupled to the base,
   wherein the indexable connector is movable between a first configuration blocking rotation of the body relative to the back plate and a second configuration allowing rotation of the body relative to the back plate about the axis, and the indexable connector is configured to hold the body in two or more index positions relative to the back plate at a selection of a user,
   wherein the indexable connector includes a first detent defined by the body and a second detent defined by the back plate, wherein the second detent engages with the first detent in the first configuration of the indexable connector to block rotation of the body relative to the back plate about the axis, and wherein the back plate is extended away from the body to release a portion of the second detent from a portion of the first detent in the second configuration of the indexable connector to allow rotation of the body relative to the back plate about the axis.

2. The vent mount of claim 1, wherein the first detent includes a stem extending from the body, at least two recesses formed into the stem, and at least two projections extending from the stem, wherein the second detent includes a socket defined by the back plate and at least two lugs arranged in the socket and separated by at least two channels, wherein, in the first configuration of the indexable connector, the lugs of the second detent are received in the recesses of the first detent and the projections of the first detent are received in the channels of the second detent and the lugs engage with the projections to block rotation of the body relative to the back plate about the axis, and wherein, in the second configuration of the indexable connector, the back plate is moved away from the body to remove the lugs from the recesses and the projections from the channels to release engagement of the lugs with the projections to allow rotation of the body relative to the back plate about the axis.

3. The vent mount of claim 2, further comprising inner ribs arranged in the recesses of the first detent and catches arranged on the lugs of the second detent, wherein the catches are configured to engage with the inner ribs to resist movement of the indexable connector from the first configuration to the second configuration.

4. The vent mount of claim 3, wherein the inner ribs extend away from the axis, and wherein the catches extend toward the axis.

5. The vent mount of claim 3, further comprising outer ribs arranged on the projections of the first detent and a retention ring arranged in the socket of the second detent and spaced apart from the lugs, wherein the retention ring is configured to engage with the outer ribs to resist removal of the back plate from the body.

6. The vent mount of claim 5, wherein the outer ribs extend away from the axis, and wherein the retention ring extends toward the axis.

7. The vent mount of claim 1, wherein the retainer of the base includes a driver, a clip, and a carriage arranged along the axis, wherein the clip is coupled to the carriage for movement with the carriage along the axis relative to the body of the base, and wherein the driver is coupled to the body and engages with the carriage to drive movement of the carriage and attached clip with rotation of the driver about the axis relative to the body.

8. The vent mount of claim 7, wherein the clip extends into a slot formed through the back plate to couple with the carriage, and wherein the slot is configured to receive the clip and to engage with the clip to block relative rotation between the clip and the back plate.

9. A vent mount comprising:
   a base including:
      a body;
      a back plate coupled to the body along an axis;
      an indexable connector configured to selectively control rotation of the body relative to the back plate about the axis;
      a retainer coupled to the body and movable along the axis between an extended position for insertion into a vehicle air vent and a retracted position to capture a louver of the vehicle air vent between the retainer and the back plate to hold the vent mount on the vehicle air vent; and
   a head coupled to the base, the head configured to engage with a case for positioning a handheld electronic device relative to the vehicle air vent,
   wherein the indexable connector is movable between a first configuration blocking rotation of the body relative to the back plate and a second configuration allowing rotation of the body relative to the back plate about the axis, and the indexable connector is configured to hold the body in two or more index positions relative to the back plate at a selection of a user,
   wherein the indexable connector includes a first detent defined by the body and a second detent defined by the back plate, wherein the second detent engages with the first detent in the first configuration of the indexable connector to block rotation of the body relative to the back plate about the axis, and wherein the back plate is extended away from the body to release a portion of the second detent from a portion of the first detent in the second configuration of the indexable connector to allow rotation of the body relative to the back plate about the axis.

10. The vent mount of claim 9, wherein the first detent includes a stem extending from the body, at least two recesses formed into the stem, and at least two projections extending from the stem, wherein the second detent includes a socket defined by the back plate and at least two lugs arranged in the socket and separated by at least two channels, wherein, in the first configuration of the indexable connector, the lugs of the second detent are received in the recesses of the first detent and the projections of the first detent are received in the channels of the second detent and the lugs engage with the projections to block rotation of the body relative to the back plate about the axis, and wherein, in the second configuration of the indexable connector, the back plate is moved away from the body to remove the lugs from the recesses and the projections from the channels to release engagement of the lugs with the projections to allow rotation of the body relative to the back plate about the axis.

11. The vent mount of claim 10, further comprising inner ribs arranged in the recesses of the first detent and catches arranged on the lugs of the second detent, wherein the catches are configured to engage with the inner ribs to resist movement of the indexable connector from the first configuration to the second configuration.

12. The vent mount of claim 11, wherein the inner ribs extend away from the axis, and wherein the catches extend toward the axis.

13. The vent mount of claim 11, further comprising outer ribs arranged on the projections of the first detent and a retention ring arranged in the socket of the second detent and spaced apart from the lugs, wherein the retention ring is configured to engage with the outer ribs to resist removal of the back plate from the body.

14. The vent mount of claim 13, wherein the outer ribs extend away from the axis, and wherein the retention ring extends toward the axis.

15. The vent mount of claim 9, wherein the retainer of the base includes a driver, a clip, and a carriage arranged along the axis, wherein the clip is coupled to the carriage for movement with the carriage along the axis relative to the body of the base, and wherein the driver is coupled to the body and engages with the carriage to drive movement of the carriage and attached clip with rotation of the driver about the axis relative to the body.

16. The vent mount of claim 15, wherein the clip extends into a slot formed through the back plate to couple with the carriage, and wherein the slot is configured to receive the clip and to engage with the clip to block relative rotation between the clip and the back plate.

17. A vent mount comprising:
a base including:
    a body;
    a back plate coupled to the body along an axis;
    an indexable connector configured to selectively control rotation of the body relative to the back plate about the axis;
    a retainer coupled to the body and movable along the axis between an extended position for insertion into a vehicle air vent and a retracted position to capture a louver of the vehicle air vent between the retainer and the back plate to hold the vent mount on the vehicle air vent; and
a head coupled to the base, the head configured to engage with a case for positioning a handheld electronic device relative to the vehicle air vent,
wherein the indexable connector includes a first detent defined by the body and a second detent defined by the back plate, the first detent includes a stem extending from the body, at least two recesses formed into the stem, and at least two projections extending from the stem, the second detent includes a socket defined by the back plate and at least two lugs arranged in the socket and separated by at least two channels, the lugs of the second detent are received in the recesses of the first detent and the projections of the first detent are received in the channels of the second detent in a first configuration of the indexable connector and the lugs engage with the projections to block rotation of the body relative to the back plate about the axis, the back plate is moved away from the body to remove the lugs from the recesses and the projections from the channels to release engagement of the lugs with the projections in a second configuration of the indexable connector to allow rotation of the body relative to the back plate about the axis, and the indexable connector is configured to hold the body in two or more index positions relative to the back plate at a selection of a user.

18. The vent mount of claim 17, wherein the retainer of the base includes a driver, a clip, and a carriage arranged along the axis, wherein the clip is coupled to the carriage for movement with the carriage along the axis relative to the body of the base, wherein the driver is coupled to the body and engages with the carriage to drive movement of the carriage and attached clip with rotation of the driver about the axis relative to the body, wherein the clip extends into a slot formed through the back plate to couple with the carriage, wherein the slot is configured to receive the clip and to engage with the clip to block relative rotation between the clip and the back plate, wherein the indexable connector is configured to block rotation of the body relative to the clip about the axis in the first configuration, and wherein the indexable connector is configured to allow rotation of the body relative to the clip about the axis in the second configuration.

* * * * *